(12) United States Patent
Cianciotto et al.

(10) Patent No.: US 7,684,668 B2
(45) Date of Patent: Mar. 23, 2010

(54) DIRECTIONAL LIGHT HOMOGENIZER ASSEMBLY

(75) Inventors: Frank T. P. Cianciotto, Tehachapi, CA (US); George H. Butler, III, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 11/810,498

(22) Filed: Jun. 5, 2007

(65) Prior Publication Data

US 2007/0242924 A1    Oct. 18, 2007

Related U.S. Application Data

(63) Continuation-in-part of application No. 10/744,922, filed on Dec. 23, 2003, now abandoned.

(51) Int. Cl.
*G02B 6/00* (2006.01)
*G02B 5/08* (2006.01)

(52) U.S. Cl. .................. 385/133; 359/857; 359/856; 359/861; 359/850; 359/616

(58) Field of Classification Search ............... 385/133
See application file for complete search history.

(56) References Cited

U.S. PATENT DOCUMENTS

| | | | |
|---|---|---|---|
| 4,632,513 A | 12/1986 | Stowe et al. | |
| 4,964,692 A | 10/1990 | Prescott | |
| 5,054,874 A | 10/1991 | Hill et al. | |
| 5,325,458 A | 6/1994 | Morrow et al. | |
| 5,375,185 A | 12/1994 | Hermsen et al. | |
| 5,553,183 A | 9/1996 | Bechamps | |
| 5,701,191 A | 12/1997 | Iwasaki et al. | |
| 5,828,505 A * | 10/1998 | Farmiga | 359/857 |
| 5,995,696 A * | 11/1999 | Miyagi et al. | 385/125 |
| 6,038,361 A * | 3/2000 | Yoshikawa et al. | 385/134 |
| 6,104,857 A | 8/2000 | Ishiharada et al. | |
| 6,125,228 A | 9/2000 | Gong | |
| 6,149,289 A * | 11/2000 | Kuramitsu et al. | 362/551 |
| 6,324,330 B1 * | 11/2001 | Stites | 385/133 |
| 6,332,688 B1 * | 12/2001 | Magarill | 359/858 |
| 6,541,694 B2 * | 4/2003 | Winston et al. | 136/246 |
| 6,595,673 B1 * | 7/2003 | Ferrante et al. | 362/551 |
| 6,771,870 B2 * | 8/2004 | Strobl et al. | 385/133 |
| 6,792,190 B2 | 9/2004 | Xin et al. | |
| 6,801,701 B1 | 10/2004 | Montgomery et al. | |

(Continued)

FOREIGN PATENT DOCUMENTS

JP    11-017959    1/1999

(Continued)

*Primary Examiner*—Frank G Font
*Assistant Examiner*—Erin D Chiem
(74) *Attorney, Agent, or Firm*—Toler Law Group

(57) ABSTRACT

An exemplary directional light homogenizer includes a one-piece, hollow hexagonal cross-section tube. The tube has an internal highly light reflective surface. The tube defines a first end configured to receive a non-homogenous light from a light source and a second end configured to output homogenized light. At least one curved section is disposed between the first end and the second end, and the curved section has a curvature greater than zero degrees and less than one hundred eighty degrees. An output section of the tube is straight, has a finite length, and terminates at the second end.

27 Claims, 3 Drawing Sheets

U.S. PATENT DOCUMENTS

| | | |
|---|---|---|
| 6,862,091 B2 * | 3/2005 | Johnson ..................... 356/326 |
| 7,113,684 B1 | 9/2006 | Cianciotto et al. |
| 7,155,106 B2 | 12/2006 | Cianciotto et al. |
| 7,171,097 B2 | 1/2007 | Cianciotto et al. |
| 7,173,775 B2 | 2/2007 | Cianciotto et al. |
| 7,182,495 B2 | 2/2007 | Cianciotto et al. |
| 7,265,906 B2 | 9/2007 | Cianciotto |
| 7,295,385 B2 | 11/2007 | Cianciotto et al. |
| 2001/0005222 A1 | 6/2001 | Yamaguchi |
| 2004/0129865 A1 * | 7/2004 | Doane ..................... 250/216 |
| 2004/0137089 A1 | 7/2004 | Dinan |
| 2004/0137189 A1 | 7/2004 | Tellini et al. |
| 2005/0084210 A1 | 4/2005 | Cha |
| 2005/0162853 A1 | 7/2005 | Jain |
| 2007/0036498 A1 | 2/2007 | Cianciotto |

FOREIGN PATENT DOCUMENTS

JP    11-250227    9/1999

* cited by examiner

US 7,684,668 B2

DIRECTIONAL LIGHT HOMOGENIZER ASSEMBLY

CROSS-REFERENCE TO RELATED APPLICATIONS

This Application is a Continuation-in-part of application Ser. No. 10/744,922 filed on Dec. 23, 2003 now abandoned, the entire contents of which are hereby incorporated by reference.

BACKGROUND

There are many systems in various industries which require a light beam which is fairly homogenous across the span of the beam of light. Most light sources, however, produce non-homogenous light emanating from the source. However, it is possible with the use of light filtering or correcting devices to produce homogenous light which can then be used in light transmission and other systems.

Light transmitted through a fiber, for example, generally has a Gaussian distribution of light intensity as it is emitted from the end of the fiber with higher intensity levels in the center of the fiber and decreasing levels extending toward the edges of the fiber diameter. Such a light intensity profile is less desirable than a uniform profile across the output end of the fiber for use in optical related equipment and light transmission devices.

In the past, it has been common to utilize a solid glass hexagonal rod of various designs to "homogenize" the light coming from the end of a fiber to produce a substantially uniform light output from the device. Since such glass rods are fragile (and require a coating be placed on the exterior side surfaces of the rod), such systems for homogenizing light sources are fragile and do not lend themselves for use in a rugged environment in which they might be easily damaged or broken. In addition, such glass rods are relatively heavy and fairly expensive to produce.

There are also many systems in various industries which require changing direction of a light beam. Optical fibers typically may used in some of these systems. Optical fibers are transparent thin fibers, such as long, thin strands of optically pure glass, for transmitting light. Typically, optical fibers are arranged in bundles, such as optical cables, and are used in various industries to transmit light or light signals, such as digital information, over long distances. Generally, two types of optical fibers exist: single-mode fibers and multi-mode fibers. Single-mode fibers transmit infrared laser light (wavelength=1,300 to 1,550 nanometers), whereas multi-mode fibers transmit infrared light (wavelength=850 to 1,300 nm) from light-emitting diodes (LEDs). Some optical fibers can be made from plastic. These fibers have a large core (0.04 inches or 1 mm diameter) and transmit visible red light (wavelength=650 nm) from LEDs. When using optical fibers, the optical cables need to be installed by curving the optical cables in relatively large diameters. Generally, it is not possible to bend an optical fiber, for example, at around a 90.degree. angle.

As discussed above, many applications require a homogenous light beam. Therefore, a non-homogeneous light beam coming out of an optical fiber is often sent through an optical light homogenizer to ensure beam conformity. As also discussed above, typically a hexagonal glass rod manufactured out of a piece of specialized glass, such as quartz glass, is used for this purpose. The hexagonal glass rod needs to be highly polished on both ends and needs to be coated on the outside with a highly reflective coating, which creates high manufacturing cost. Furthermore, the hexagonal glass rod is highly fragile and needs to be handled carefully, which might be difficult to realize in industrial applications. Still further, the light passing through the hexagonal glass rod may lose some of its intensity and the hexagonal glass rod cannot be adjusted to different wavelengths.

Some fiber optic applications, such as data links, require more than simple point-to point connections. Fiber optic components that can redistribute, split or combine optical signals throughout a fiber optics system may be required for these applications. One type of fiber optic components that allow for redistribution of optical signals is a fiber optic coupler. A fiber optic coupler is a device that can distribute the optical signal from one fiber among two or more fibers. A fiber optic coupler can also combine the optical signal from two or more fibers into a single fiber. Fiber optic couplers attenuate the signal resulting in a loss of intensity because the input signal is divided among the output ports. Fiber optic couplers can be either active or passive devices. The difference between active and passive couplers is that a passive coupler redistributes the optical signal without optical-to-electrical conversion. Active couplers are electronic devices that split or combine the signal electrically and use fiber optic detectors and sources for input and output. An optical splitter is a passive device that typically splits the optical power carried by a single input fiber into two output fibers. The input optical power is normally split evenly between the two output fibers. However, an optical splitter may distribute the optical power carried by input power in an uneven manner. In this case, an optical splitter may split most of the power from the input fiber to one of the output fibers and only a small amount of the power into the secondary output fiber. Usually, optical splitters have low transmission efficiency resulting in a loss of optical power due to their design.

Thus, improvements may be possible by providing a rugged device that can redirect a light beam and provide a homogenous light output without use of glass optics, such as a mirror, in tightly confined regions where normal bending of optical fibers or placement of glass optics such as a mirror is not possible.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

According to an exemplary embodiment, a directional light homogenizer includes a one-piece, hollow hexagonal cross-section tube. The tube has an internal highly light reflective surface. The tube defines a first end configured to receive a non-homogenous light from a light source and a second end configured to output homogenized light. At least one curved section is disposed between the first end and the second end, and the curved section has a curvature greater than zero degrees and less than one hundred eighty degrees.

According to an aspect, an output section of the tube is straight, has a finite length, and terminates at the second end. The finite length of the output section of the tube can be about four to six times the distance from one land to an opposite land internally of the tube, and may be no more than about six times the distance from one land to an opposite land internally of the tube.

According to another exemplary embodiment, light is redirected and homogenized. A focused light beam of non-homogenous light is provided, and the light is received in a first end of a one-piece, hollow, directional light homogenizer tube which has a hexagonal cross-section with an internal highly light reflective surface. Direction of the light is changed greater than zero degrees and less than one hundred eighty degrees in at least one curved section of the tube. The light is homogenized in a straight output section of the tube that has a finite length and that terminates at a second end of the tube. The homogenized light is output from the second end of the tube.

According to an aspect, the light is homogenized by reflecting the light a number of times off the internal highly light reflective surface in the straight output section of the tube. For example, the light may be reflected about five times off the internal highly light reflective surface in the straight output section of the tube.

According to another aspect, the homogenized light that is output from the second end of the tube may be split, such as by optically coupling optical fibers to the second end of the tube.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1A:
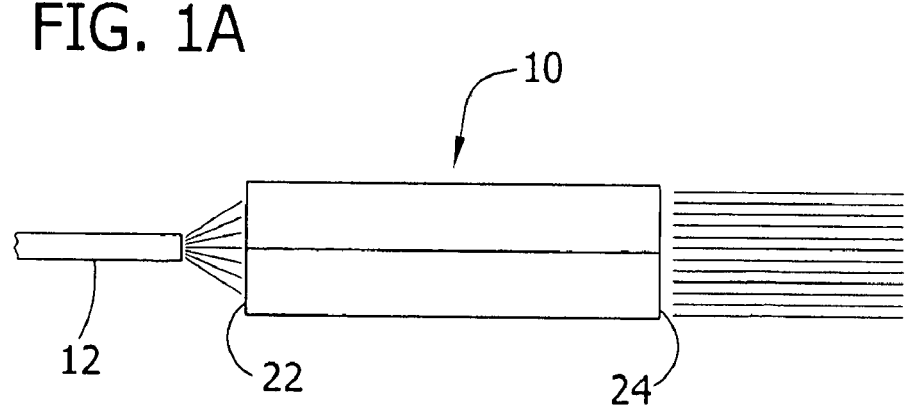
FIG. 1A is a side view of a light source and an embodiment of a homogenizer tube.
Figure 1B:
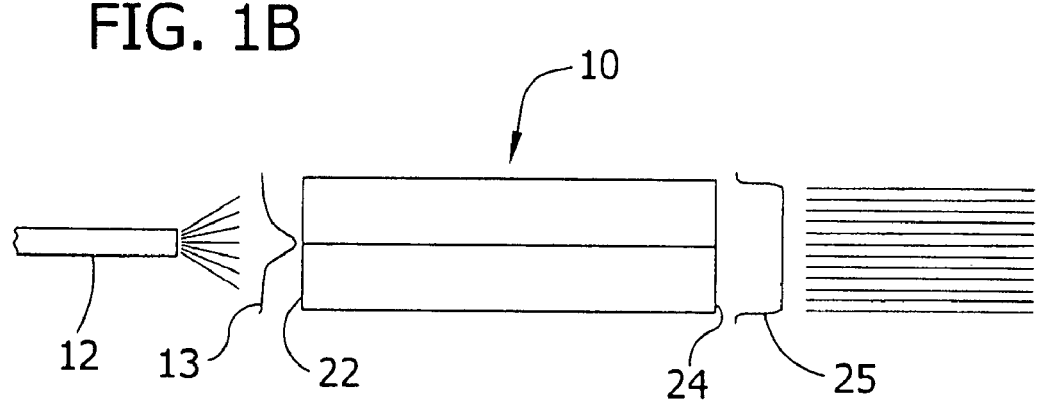
FIG. 1B is a side view of a light source as a "Gaussian" profile and the light output as a "top hat" profile.

In an embodiment as illustrated in FIGS. 1A and 1B, a hexagonal cross-sectional tube shown generally as 10 is provided which receives light internally from a light source 12 such as a single optic fiber. The hexagonal cross-sectional tube 10 is formed within an internal highly reflective surface 14 of hexagonal cross-section, preferably formed of gold or silver which forms a first metallic layer 16 having the reflective surface 14. In order to support the relatively thin metallic layer 16 a second metallic layer 18 is provided. This second metallic layer is preferably formed of nickel since it is cheaper than gold or silver and can provide the needed support structure for the relatively thin first layer 16.

Figure 2:
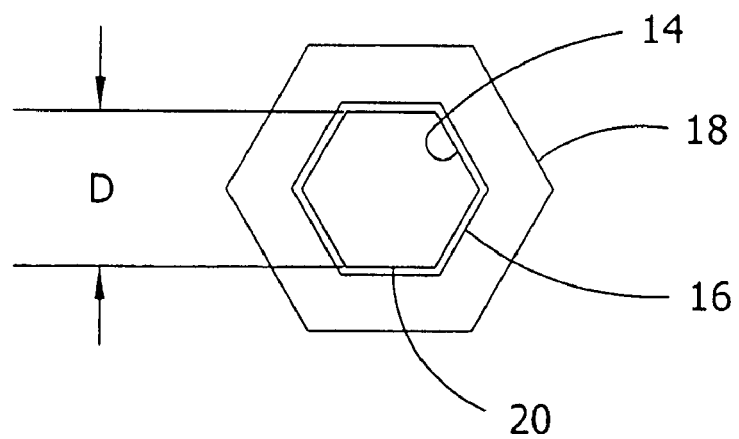
FIG. 2 is a cross-sectional view of a mandrel with multiple layers of metallic coating thereon.

In order to fabricate the hexagonal cross-section tube 10 forming the light homogenizer, a mandrel 20 is utilized (see FIG. 2). Mandrel 20 is preferably made of aluminum and given a surface finish appropriate to produce the desired reflectivity on the internal surface of the tube, as discussed below. The first metallic layer 16 is applied to the mandrel 20 through any of several known techniques such as electroforming. Electroforming is substantially a process of plating the mandrel 20 with a layer of gold or silver to form the layer 16 and then further plating with a layer of nickel to form the outer support member or second metallic surface 18. The aluminum mandrel 20 is then removed from the interior surface 14 by melting, chemically etching, or exploiting differences in thermal coefficients of expansion between the electroformed parts and the mandrel. For example, in the present case the aluminum mandrel 20 is coated with silver or gold to form the layer 16 and then coated to form the second layer of nickel 18. The aluminum mandrel is then preferably chemically dissolved leaving the nickel hexagonal tube with a highly reflective interior surface of gold or silver. However, other suitable materials may be utilized.

Figure 3:
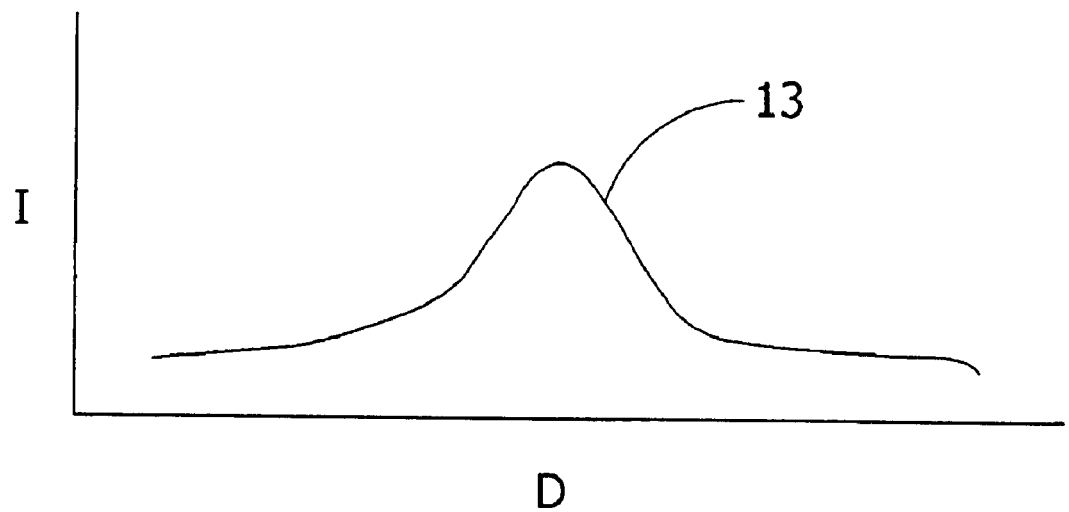
FIG. 3 shows an example of a Gaussian distribution profile from a light source such as that of FIG. 1.
Figure 4:
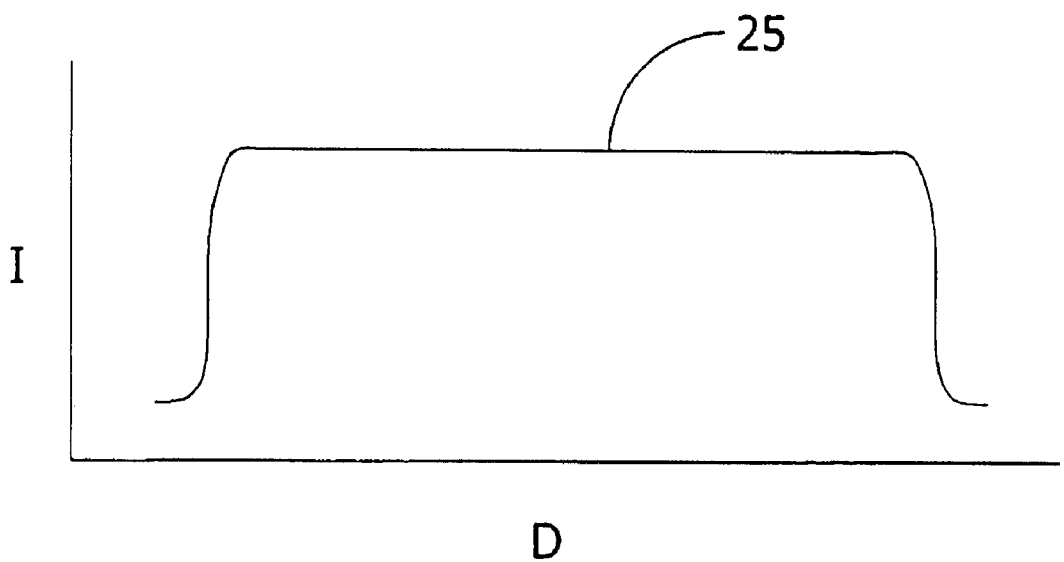
FIG. 4 illustrates a top hat profile of homogenized light output from the tube of FIG. 1.

The first layer of metallic coating 16 with the internal highly reflective surface 14 is formed of gold or silver or some other selected material which can maximize the performance of the hexagonal tube for specific light spectrums based on the reflectivity of the material, which selection process is well known to those skilled in the art. By the use of this highly reflective internal surface 14 the hex tube is capable of transforming a single fiber optic light output from the Gaussian shape 13 shown in FIGS. 1B and 3 to the top hat profile 25 shown in FIGS. 1B and 4 as an output from the homogenizer tube 10. In FIGS. 3 and 4 the graph shows an exemplary pattern of light intensity (I) versus the distance (D) across the fiber or from land-to-land in the tube 10 as shown as D in FIG. 2. FIG. 1B pictorially shows the "Gaussian" input and "top hat" (homogenous) output.

FIG. 3 is an exemplary illustration of the light intensity from a single optic fiber output where the light intensity profile varies across the diameter of the fiber. As shown in FIG. 3 the higher intensity light is in the center of the fiber and decreases near the outer edges of the fiber. When light from the optic fiber 12 enters the end 22 of tube 10 with the profile of FIG. 3 and is reflected from the surfaces of the hexagonal cross-sectional tube 10 it is transformed at the output end 24 of the tube to the top hat pattern of FIG. 4 where the intensity is substantially uniform across the span of the tube from land-to-land. In addition, the relatively small diameter of the light beam coming from a single fiber optic, such as for example, 0.020 inch (0.5 mm) diameter as it exits the optic fiber 12 is transformed in the tube to 0.240 inches (6 mm) from land-to-land at the exit end 24 of tube 10. To achieve this example, a hexagonal tube 10 having an internal light reflective surface having an internal transverse dimension of 0.254 inch (6.35 mm) from flat to opposite flat and a length of 1.016 inch (25.4 mm) was utilized.

As the light travels down the tube 10 it experiences numerous reflections off the highly light reflective internal surface 14. Each reflection allows the light beam to "fold over" upon itself. With each reflection the beam is undergoing a change in direction and becoming homogenized. To that end, the internal length-to-width (flat-to-flat) dimensions of tube 10 are preferably such that the length is approximately four to six times the internal width of tube 10. This length-to-width ratio is preferable because a smaller ratio may not allow enough "bounce" of the light to adequately homogenize it before it exits the tube 10. For example, after around five reflections the light beam may be considered to be substantially homogenized (that is, around 99 percent or more homogenous). On the other hand, a substantially larger ratio would allow too much "bounce" of the light which would reduce the energy level of the light at the output of the tube 10. That is, lengths greater than around six times the internal width of the tube 10 may begin to introduce internal losses without any substantial gain in uniformity of the beam. However, other ratios may be used as desired for a particular application.

The surface smoothness of the highly light reflective internal surface 14 can vary substantially depending upon the purpose for which the present system is being utilized. However, in an embodiment where the internal highly light reflective surface is silver the optical smoothness of the surface is preferably in the range of $\lambda/2$ to $\lambda/6$ and more preferably about $\lambda/4$. This is particularly useful where the wave length of the light from the light source is in the visible to near infrared range of approximately 400 to 780 nanometers. This same surface smoothness range is also appropriate for establishing the highly light reflective surface for many uses so long as the reflectivity of the surface is at least 99 percent. It is envisioned that other optical smoothness and surface reflectivity could be used.

The thickness of the internal layer of reflective material can vary as desired so long as it is adequately thick to provide the highly light reflective surface described above. The tube 10 could be formed of a single material so long as it is thick enough to be self supporting. However, for cost reasons, the thickness of the first layer 16, particularly when formed of gold or silver should be relatively thin, for example about 0.0001 to 0.0002 inches thick, and the second layer 18 should be relatively thick, for example about 0.010 to 0.020 inches thick. Thicknesses different from the forgoing examples may also be used as desired for a particular application.

Although the light source 12 has been described as an optic fiber, any light source could be used. It is also contemplated that the light source could be positioned at least partially inside the tube, unlike prior art systems where the glass rod is solid. In addition, because the output is homogenized, the homogenized output from the tube 10 can be split into more than one output fibers, with each fiber receiving an equal amount of energy.

Figure 5:
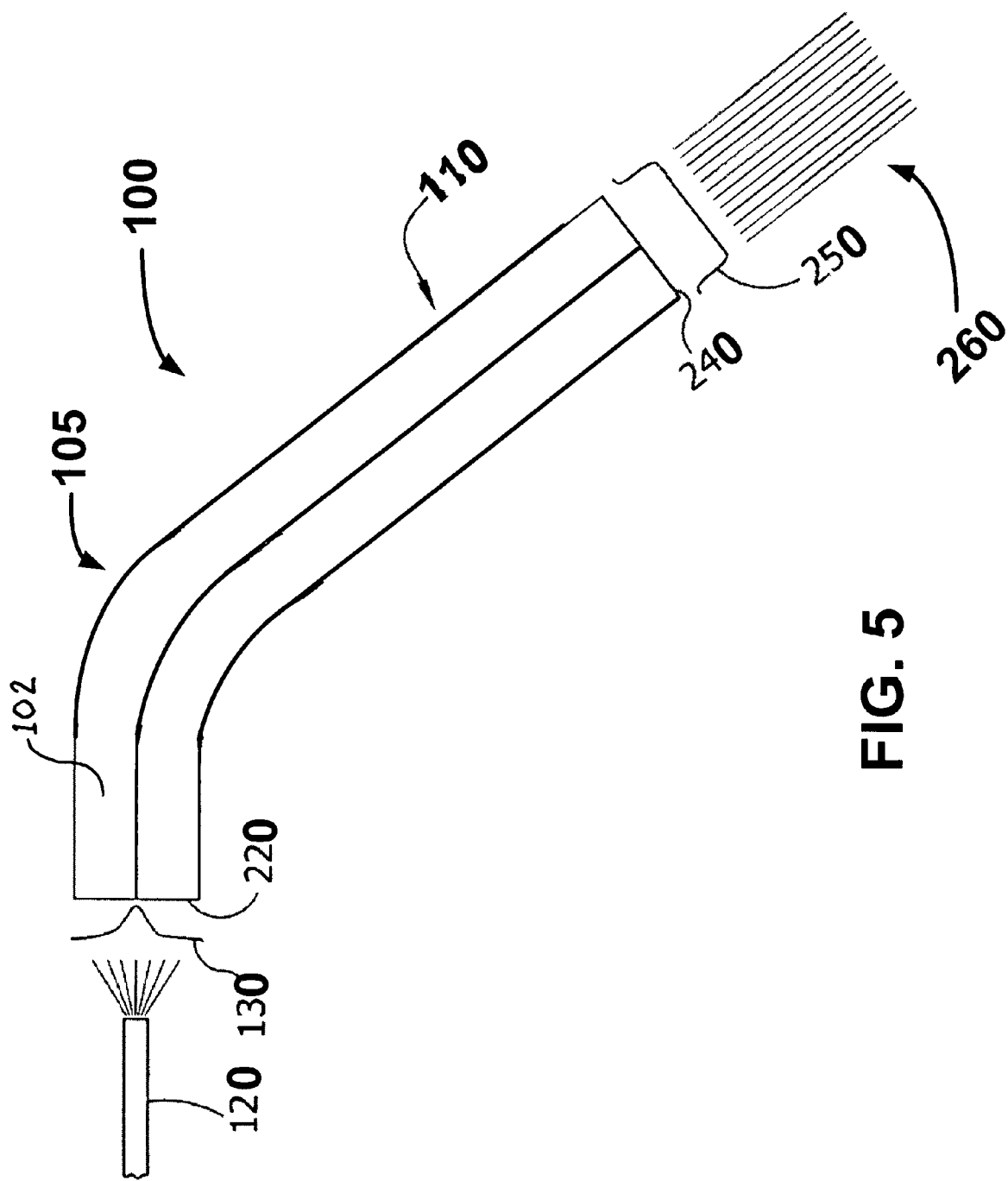
FIG. 5 is a side view of a light source as a "Gaussian" profile and an exemplary directional light tube having light output having a "top hat" profile.

Referring now to FIG. 5 and by way of overview, in another non-limiting, exemplary embodiment a directional light homogenizer 100 can redirect and homogenize light—without use of any glass optics. The directional light homogenizer 100 thus can provide a robust, rugged, and efficient device that is less prone to breakage and leakage than devices that include glass optics. Further, because output of the directional light homogenizer 100 is substantially homogenized, output of the directional light homogenizer 100 can be split.

Still by way of overview, in an exemplary embodiment the directional light homogenizer 100 includes a one-piece, hollow hexagonal cross-section tube 102. The tube 102 has an internal highly light reflective surface. The tube 102 defines a first end 220 configured to receive a non-homogenous light 130 from a light source 120 and a second end 240 configured to output homogenized light 250. At least one curved section 105 is disposed between the first end 220 and the second end 240, and the curved section 105 has a curvature greater than zero degrees and less than one hundred eighty degrees. An output section 110 of the tube 102 is straight, has a finite length, and terminates at the second end 240. Details will be set forth below.

The one-piece, hollow hexagonal cross-section tube 102 is constructed of the same materials and in the same manner as the tube 10 (FIGS. 1A, 1B, and 2). That is, referring additionally to FIG. 2, the one-piece, hollow hexagonal cross-section tube 102 is formed within the internal highly reflective surface 14 of hexagonal cross-section, preferably formed of gold or silver which forms the first metallic layer 16 having the reflective surface 14. In order to support the relatively thin metallic layer 16 the second metallic layer 18 is provided. This second metallic layer 18 is preferably formed of nickel since it is cheaper than gold or silver and can provide the needed support structure for the relatively thin first layer 16.

Still referring to FIGS. 2 and 5, the one-piece, hollow hexagonal cross-section tube 102 is fabricated by utilizing the mandrel 20 as described above. That is, the relatively thin metallic layer 16 is formed on the mandrel 20, the second metallic layer 18 is applied on top of the relatively thin metallic layer 16, and the mandrel 20 is separated from the relatively thin metallic layer 16, all in the same manner as described above. Therefore, details need not be repeated.

In addition, the surface smoothness of the internal highly reflective surface 14 is the same as that described above. That is, in an embodiment where the internal highly light reflective surface 14 is silver the optical smoothness of the surface is preferably in the range of $\lambda/2$ to $\lambda/6$ and more preferably about $\lambda/4$. Moreover, thicknesses of the relatively thin metallic layer 16 and the second metallic layer 18 are also the same as that described above.

Referring now to FIGS. 3 and 5, the first end 220 is configured to receive the non-homogenous light 130 from the light source 120. The non-homogenous light 130 is the same as the non-homogeneous, or Gaussian, light 13 as that described above. The light source 120 is the same as the light source 12 (FIGS. 1A and 1B). That is, given by way of non-limiting example the light source 120 suitably may be a single optic fiber.

Referring back to FIG. 5, unlike the tube 10 (FIGS. 1A and 1B), at least one of the curved sections 105 is disposed between the first end 220 and the second end 240. The curved section 105 has a curvature greater than zero degrees and less than one hundred eighty degrees. Thus, as a result of its construction described above, the directional light homogenizer 100 can redirect light—without use of any optic fiber or glass optics such as mirrors. The directional light homogenizer thus can provide a robust and efficient device that is less prone to breakage and leakage than optic fiber and devices that include glass optics. Moreover, the directional light homogenizer 100 can allow for bending of light around corners or other obstructions from zero degrees to one hundred eighty degrees in tightly confined regions where the normal bending of fiber optics or the placement of a mirror is not possible.

The output section 110 of the tube 102 is straight, has a finite length, and terminates at the second end 240. As discussed above, the length of the output section 110 can be about four to six times the distance from one land to an opposite land internally of the tube 102, and in some embodiments the length of the output section 110 may be no more than about six times the distance from one land to an opposite land internally of the tube 102.

As discussed above for the tube 10 (FIGS. 1A and 1B), as the light travels down the output section 110 it experiences numerous reflections off the highly light reflective internal surface 14. Each reflection allows the light beam to "fold over" upon itself. With each reflection the beam is undergoing a change in direction and becoming homogenized. To that end, the internal length-to-width (flat-to-flat) dimensions of the output section 110 are preferably such that the length is approximately four to six times the internal width of the output section 110. This length-to-width ratio is preferable because a smaller ratio may not allow enough "bounce" of the light to adequately homogenize it before it exits the output section 110. For example, after around five reflections the light beam may be considered to be substantially homogenized (that is, around 99 percent or more homogenous). On the other hand, a substantially larger ratio would allow too much "bounce" of the light which would reduce the energy level of the light at the output of the output section 110. That is, lengths greater than around six times the internal width of the output section 110 may begin to introduce internal losses without any substantial gain in uniformity of the beam. However, other ratios may be used as desired for a particular application.

In light of the above discussion of the curved section 105 and the output section 110, it will be appreciated that no limitations whatsoever are intended regarding the curved section 105. For example, a radius of curvature of the curved section 105 need not be constant and can vary as desired for a particular application. Moreover, multiple curved sections 105 can be combined in three dimensions. However, because a very small fraction of the energy is lost with each reflection, the longer the overall length of the directional light homogenizer 100 (because of inclusion of multiple curved sections 105) the less efficient the directional light homogenizer 100 may become (if the overall length of the tube 102 exceeds around six times the internal width of the tube 102). In view of the above discussion, while no limitations are intended regarding the number or curvature or configurations of the curved sections 105, one of ordinary skill in the art will appreciate that there is to be a straight section—that is, the output section 110—after the last curved section, and the length of the straight section should be between around four to six times (and no more than around six times) the internal width of the straight section.

Referring now to FIGS. 4 and 5, the second end 240 is configured to output the homogenized light 250. The homogenized light 250 is the same as the homogenized light 25 as that described above. To that end, the homogenized light 250 has the top hat pattern of FIG. 4 where the intensity is substantially uniform across the span of the output section 110 from land-to-land.

Referring back to FIG. 5, the homogenized light 250 that is output from the second end 240 may be split. To that end, an optical splitter can be optically coupled to the second end 240. Moreover, because the output is homogenized, the homogenized light 250 that is output from the second end 240 can be split into more than one output fibers, with each fiber receiving an equal amount of energy. Thus, in an exemplary embodiment, optical fibers 260 can be optically coupled to the second end 240.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A directional light homogenizer comprising:
a one-piece, hollow, hexagonal cross-section tube having an internal light reflective surface, the tube having:
a first end to receive a non-homogenous light from a light source;
a second end to output homogenized light; and
at least one curved section of the tube between the first end and the second end, the curved section having a curvature greater than zero degrees and less than one hundred eighty degrees;
wherein an overall length of the tube is no more than approximately six times a distance from one side to an opposite side internally of the tube.

2. The light homogenizer of claim 1, wherein the internal light reflective surface is an internal surface of a tubular member supported by an external support member.

3. The light homogenizer of claim 2, wherein the external support member includes a second tubular member that is thicker than the tubular member.

4. The light homogenizer of claim 2, wherein the internal light reflective surface includes a metal chosen from gold and silver and the external support member includes nickel.

5. The light homogenizer of claim 2, wherein the tubular member has a thickness between about 0.0001 inches and about 0.0002 inches.

6. The light homogenizer of claim 2, wherein the external support member has a thickness between about 0.010 inches and about 0.020 inches.

7. The light homogenizer of claim 2, wherein the external support member is electroformed on an external surface of the tubular member.

8. The light homogenizer of claim 2, wherein the tubular member is formed by electroforming a metal on an external surface of a smooth mandrel.

9. The light homogenizer of claim 1, wherein the internal light reflective surface includes a metal chosen from gold and silver.

10. The light homogenizer of claim 9, wherein the internal light reflective surface has an optical smoothness in a range of about $\lambda/2$ to about $\lambda/6$.

11. The light homogenizer of claim 10, wherein the internal light reflective surface has an optical smoothness of about $\lambda/4$.

12. The light homogenizer of claim 1, wherein the at least one curved section comprises two or more curved sections of the tube.

13. The light homogenizer of claim 1, wherein the at least one curved section has a variable radius of curvature.

14. A directional light homogenizing system comprising:
a light source configured to provide a beam of non-homogenous light; and
a directional light homogenizer tube to receive light from the light source, the directional light homogenizer tube including:
a one-piece, hollow, hexagonal cross-section tube having an internal light reflective surface, the tube having:
a first end to receive the beam of non-homogenous light from the light source;
a second end to output homogenized light; and
at least one curved section between the first end and the second end of the tube, the curved section having a curvature greater than zero degrees and less than one hundred eighty degrees;
wherein an overall length of the tube is no more than approximately six times a distance from one side to an opposite side internally of the tube.

15. The system of claim 14, wherein the tube further comprises a straight output section between the at least one curved section and the second end.

16. The system of claim 15, wherein a length of the output section of the tube is approximately four to six times a distance from one side to an opposite side internally of the tube.

17. The system of claim 14, wherein the internal light reflective surface is an internal surface of a tubular member supported by an external support member, wherein the external support member has a thickness that is greater than a thickness of the tubular member.

18. The system of claim 14, wherein the internal light reflective surface has an optical smoothness in a range of about $\lambda/2$ to about $\lambda/6$.

19. The system of claim 18, wherein the internal light reflective surface has an optical smoothness of about $\lambda/4$.

20. The system of claim 14, wherein the light source includes at least one optical fiber.

21. The system of claim 14, further comprising an optical splitter optically coupled to the second end of the tube.

22. The system of claim 21, wherein the optical splitter includes a plurality of optical fibers.

23. The system of claim 14, wherein the light source is at least partially inside the tube.

24. A method of redirecting and homogenizing light, the method comprising:

receiving a beam of light in a first end of a one-piece, hollow, directional light homogenizer tube, the tube having a hexagonal cross-section with an internal light reflective surface;

changing a direction of the light to be greater than zero degrees and less than one hundred eighty degrees in at least one curved section of the tube;

homogenizing the light in a straight output section of the tube, wherein the straight output section extends from the at least one curved section and terminates at a second end of the tube; and outputting homogenized light from the second end of the tube;

wherein an overall length of the tube is no more than approximately six times a distance from one side to an opposite side internally of the tube.

25. The method of claim 24, wherein homogenizing the light includes reflecting the light approximately five times off the internal light reflective surface in the straight output section of the tube.

26. The method of claim 25, further comprising splitting the homogenized light that is output from the second end of the tube.

27. The method of claim 26, wherein splitting the homogenized light includes optically coupling a plurality of optical fibers to the second end of the tube.

* * * * *